Figure 1:
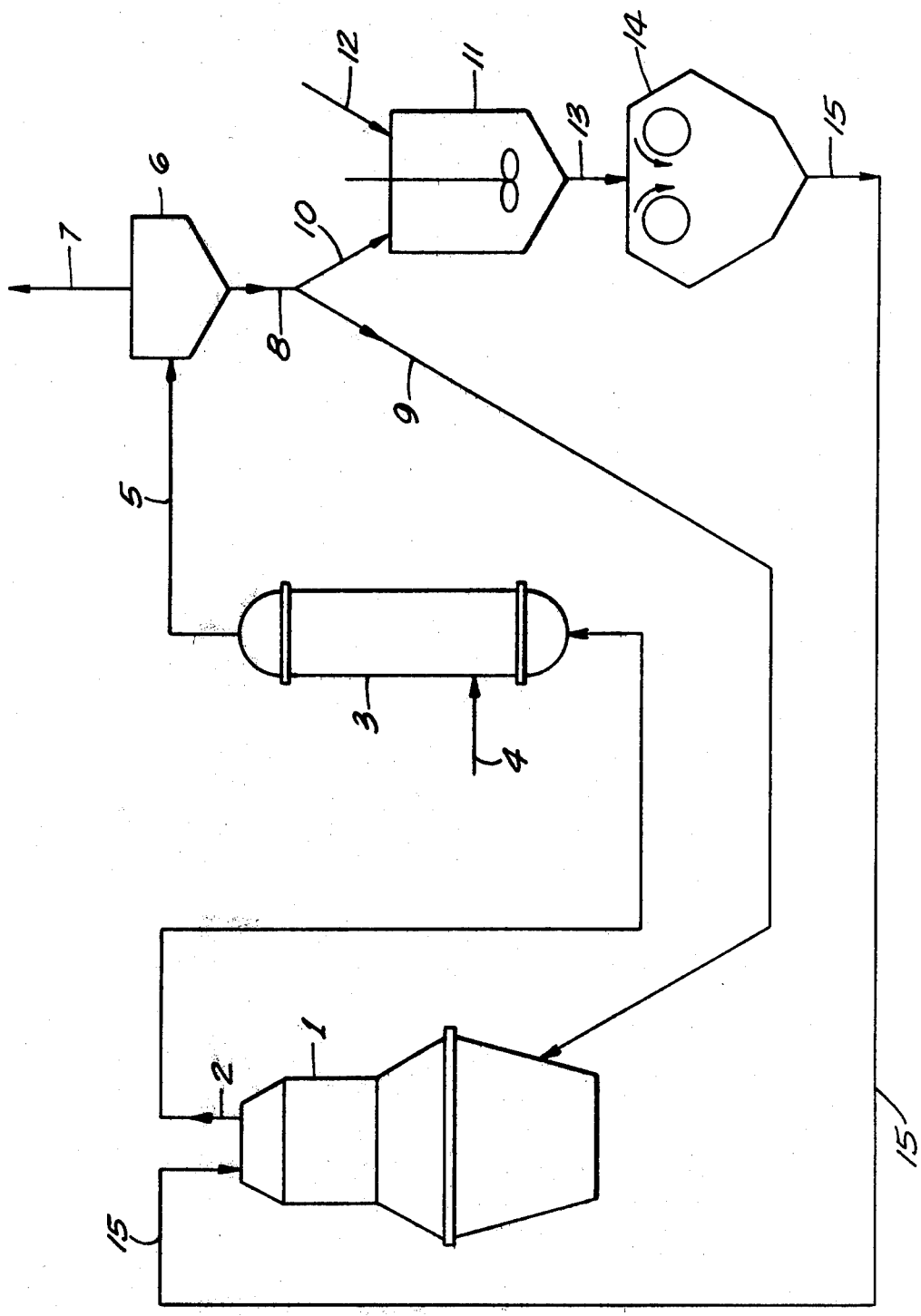

United States Patent [19]

Blumenthal et al.

[11] 4,248,627

[45] Feb. 3, 1981

[54] PROCESS FOR THE MANUFACTURE AND USE OF HIGH PURITY CARBONACEOUS REDUCTANT FROM CARBON MONOXIDE-CONTAINING GAS MIXTURES

[75] Inventors: Jack L. Blumenthal; Maksymilian Burk, both of Los Angeles; Neal A. Richardson, Rancho Palos Verdes, all of Calif.

[73] Assignee: TRW Inc., Redondo Beach, Calif.

[21] Appl. No.: 906,506

[22] Filed: May 16, 1978

[51] Int. Cl.³ ............................................. C21B 5/02
[52] U.S. Cl. ...................................................... 75/42
[58] Field of Search ................... 75/38, 41, 42, 48, 26

[56] References Cited

U.S. PATENT DOCUMENTS

| | | | |
|---|---|---|---|
| 1,120,682 | 12/1914 | Bucher | 423/381 |
| 1,352,162 | 9/1920 | Williams | 423/451 |
| 1,792,507 | 2/1931 | Percy | 75/35 |
| 1,803,855 | 5/1931 | Kramer et al. | 423/459 |
| 1,964,744 | 7/1934 | Odell | 134/60 |
| 2,008,270 | 7/1935 | Willekens | 75/42 |
| 2,107,980 | 2/1938 | Elian | 75/38 |
| 2,598,735 | 6/1952 | Webb | 75/42 |
| 2,711,951 | 6/1955 | West | 75/42 |
| 2,780,537 | 2/1957 | Stelling et al. | 75/26 |
| 2,799,576 | 7/1957 | Gumz et al. | 75/42 |
| 2,873,183 | 2/1959 | Pike | 75/35 |
| 3,151,974 | 10/1964 | Rheinlander | 75/42 |
| 3,356,488 | 12/1967 | Walsh | 75/34 |
| 3,392,008 | 7/1968 | Ward | 75/34 |
| 3,392,218 | 7/1968 | Kalina | 263/52 |
| 3,475,160 | 10/1969 | Heinzelmann et al. | 75/36 |
| 3,494,738 | 2/1970 | Gray | 23/208 |
| 3,637,368 | 1/1971 | Bessant | 75/26 |
| 3,788,835 | 1/1974 | Lewis et al. | 75/26 |
| 3,841,849 | 10/1974 | Beckmann | 44/10 H |
| 3,861,885 | 1/1975 | Schora | 44/1 R |
| 3,885,023 | 5/1975 | Gray et al. | 423/439 |
| 3,890,142 | 6/1975 | Gelada et al. | 75/91 |
| 3,950,267 | 4/1976 | Arakawa et al. | 252/425 |
| 4,065,296 | 12/1977 | Gemmeke et al. | 75/48 |
| 4,116,680 | 9/1978 | Jordah | 75/41 |

FOREIGN PATENT DOCUMENTS

| | | | |
|---|---|---|---|
| 161073 | 2/1955 | Australia | 75/42 |
| 830592 | 3/1960 | United Kingdom | 75/34 |
| 1073025 | 6/1967 | United Kingdom | 75/68 |
| 1127145 | 9/1968 | United Kingdom | 75/25 |
| 1173821 | 12/1969 | United Kingdom | 75/72 |
| 1473723 | 5/1977 | United Kingdom | 75/84 |

*Primary Examiner*—M. J. Andrews
*Attorney, Agent, or Firm*—Donald R. Nyhagen; John J. Connors

[57] ABSTRACT

Substantially ash-free carbonaceous reductant for use in reduction processes is made by recovering carbon from unused carbon monoxide. The carbon monoxide contacts a catalyst which promotes formation of carbon on the catalyst. Since the off-gases from many metal ore reduction processes employing coke include a significant quantity of carbon monoxide, this carbon monoxide may be recovered and used to form the reductant which is fed to the reduction process to replace a part of the coke consumed. Provided most of the carbon monoxide in the off-gases is utilized, very favorable cost savings are achieved when the ash-free reductant is used in place of the coke. Moreover, in some instances, the ore being reduced may be used as the catalyst. Since this ore-catalyst is at least partially reduced during manufacture of the reductant, a benefit is obtained.

14 Claims, 2 Drawing Figures

PROCESS FOR THE MANUFACTURE AND USE OF HIGH PURITY CARBONACEOUS REDUCTANT FROM CARBON MONOXIDE-CONTAINING GAS MIXTURES

THE INVENTION

Our invention comprises replacing a part of the carbonaceous material, usually expensive metallurgical grade coke, used in ore reduction processes with high purity carbonaceous reductant made from carbon monoxide. When the reductant is formed into briquettes, we refer to it as synthetic coke. When the reductant is in powder form suitable for injection into a blast furnace through the furnace's tuyeres, we refer to it as a tuyere injectant. The high purity carbonaceous reductant is substantially ash and sulfur free and has a high carbon-to-hydrogen ratio. Accordingly, this carbonaceous reductant is ideally suited to replace a part of the coke. The carbon monoxide used to make the high purity carbonaceous reductant is preferably derived from the by-product gas mixtures of the reduction process. This hot carbon monoxide, which is essentially sulfur-free, reacts on contact with a suitable catalyst to produce the carbonaceous reductant. Suitable catalysts may include the metal ore that undergoes treatment in the reduction process. In this case, such metal ore is partially reduced and may be fed to the reduction operation with the high purity carbonaceous reductant. If the catalyst is the metal ore being reduced, then the carbonaceous reductant is considered ash free. If the catalyst is a different metal or metal ore than the ore being reduced, then the carbonaceous reductant will be low in ash.

Though our invention may use many different carbon monoxide-containing gas mixtures, including basic oxygen furnace off-gas and coal derived producer gas, the preferred embodiment forms high purity carbonaceous reductant from blast furnace off-gases (furnace gases). Furnace gases having high concentrations of carbon monoxide are currently used as relatively low value heat or fuel sources. Thus, in conventional reduction processes a substantial part of the reducing potential of the high cost coke is lost. Instead, our invention provides for the recovery by catalytic conversion of part of the carbon monoxide to high purity carbonaceous reductant, which is then fed to the furnace to replace a portion of the coke. Hence, our process uses the coke more efficiently for ore reduction. We are able to utilize at least 50% of the carbon monoxide in the blast furnace off-gas, and have exceeded 80% utilization. This makes the economics of our process superior to ore reduction processes which do not recover the carbon monoxide as a reductant that is fed to the blast furnace.

When we refer to high utilization of the carbon monoxide in the off-gas, one should bear in mind that not all the carbon monoxide is converted to the reductant. The carbon monoxide, as it contacts the catalyst, is converted to carbon in accordance with the following equations:

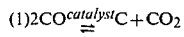
(1) $2CO \underset{\rightleftharpoons}{\overset{catalyst}{\longrightarrow}} C + CO_2$

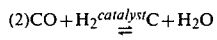
(2) $CO + H_2 \underset{\rightleftharpoons}{\overset{catalyst}{\longrightarrow}} C + H_2O$ Equation (1) represents the principal reaction, carbon monoxide disproportionation; equation (2) the secondary reaction. Thus, if 80% of the carbon monoxide is utilized, only about ½ of this is converted into the reductant.

Once formed the high purity carbonaceous reductant may, or may not, be separated from the catalyst, as desired, and then fed to the reduction zone, typically in either solid particulate form or in the form of briquettes. In a blast furnace process, the particulate form is preferably injected as a coke replacement through furnace tuyeres near the base of the furnace. The briquette form is fed to such furnaces through the coke feed line or lines to the top of the furnace.

In a preferred embodiment, where metal or metal ore is undergoing treatment in a reaction zone, and such metal or metal ore is a suitable catalyst for carbon deposition, the catalyst itself may be and preferably is fed to the reaction zone with the high purity carbonaceous reductant. Thus, where iron ore is reduced to iron in a blast furnace with coke as the carbonaceous material, the iron ore may be used to catalyze the reaction of carbon monoxide to high purity carbonaceous reductant, and then be fed with the high purity carbonaceous reductant to the blast furnace.

The high purity carbonaceous reductant is low in ash and sulfur content, and is superior, in a chemical sense, to metallurgical grade coke. Typically, the ash content of the high purity carbonaceous reductant is not more than about 1% by weight, the sulfur content is not more than about 0.01% by weight, and the carbon-to-hydrogen ratio is at least about 10, but may be in the range of about 20 to about 40. These properties are obtained by catalytically reacting carbon monoxide at a temperature in the range of about 400° to about 600° C. and at a pressure in the range of about 0 to about 100 psig. The carbon-to-hydrogen ratio can be controlled by controlling the reaction temperature. In general, the higher the reaction temperature, the higher the carbon-to-hydrogen ratio obtained.

Under the above conditions, the carbon monoxide is rapidly reacted to form the carbonaceous reductant. Typically, contact time of carbon monoxide with the catalyst is within the range of about 2 to about 20 seconds. Typically, from about 50% to about 80% of the carbon monoxide and from about 10% to about 50% of the hydrogen in the gas mixtures is utilized to make the high purity carbonaceous reductant in these short contact times.

As formed in our process, high purity carbonaceous reductant has high surface area. It is also dry, hot, and highly frangible, being readily broken into particles ranging typically from −100 to −300 mesh. Thus, it is an excellent tuyere injectant. By contrast, when coal is used as as tuyere injectant, it must be dried, crushed, and preheated. Thus, the reductant of our invention provides simplified handling.

In blast furnace processes, where maximum coke replacement is desired, the high purity carbonaceous reductant is a far better tuyere injectant than an equal weight of coals, fuel oils, natural gas, and other carbonaceous materials that contain higher proportions of ash or sulfur, have lower carbon-to-hydrogen ratios, or both. This is because essentially only carbon monoxide and hydrogen can form in the high temperature tuyere zone and thus the only net heat producing reaction is the oxidation of carbon to carbon monoxide. Other reactions such as the dissociation of the hydrogen from the carbon in oil or coal are endothermic and decrease the net heat release in the tuyere zone. Because the thermal balance in the zones adjacent the tuyeres must be maintained as close as feasible to the thermal balance where no injectant is added, the high carbon-to-hydrogen ratio and low ash of the carbonaceous reductant we use means that one pound of this reductant provides greater replacement heating value than a pound of coal or fuel oil. This gain more than compensates for the diversion of carbon monoxide from use as a fuel to use in forming a high purity reductant, because many fuels can be substituted for process heating which are significantly lower in cost than the coke replaced by the high purity reductant.

We have made a study of the economics of different tuyere injectants. The replacement ratio, i.e., the pounds of coke replaced by a pound of injectant, is a major consideration because higher coke replacement ratios yield more favorable economics. To a first approximation, the replacement ratio of a given tuyere injectant can be estimated by determining the heat and material balance required in the reaction zone, and then calculating the fixed quantity of high temperature sensible heat (above 1800° F.) for each ton of hot metal to be produced in the reaction zone. The quantity of tuyere feed injectant so calculated must be corrected for any additional fuel required to heat or remove moisture free air fed to the reaction zone with the injectant. The replacement ratio must also be corrected for the ash content of the injectant to determine more accurately the true replacement ratio. In "Auxiliary Fuels for the Blast Furnace," published in the August, 1967 issue of "Iron and Steel Engineer," David L. McBride explains how to calculate the replacement ratio. In "Coal for Blast Furnace Injection," published in "Energy Use and Conservation in the Metals Industry," A.I.M.E., New York, 1975, Messrs. A. K. Garbee and L. N. Fletcher provide a formula for the ash content correction.

When replacement ratios are calculated according to the McBride formula adjusted for ash content according to the Garbee/Fletcher formula, the following replacement ratios are obtained:

| Tuyere Injectant | Replacement Ratio Based on Thermal Balance Corrected For Blast Temperature Deficit | Replacement Ratio Corrected for Ash Content for Injectant |
| --- | --- | --- |
| High Purity carbonaceous reductant | 1.05 | 1.52 |
| Low Volatile Coal | 0.94 | 0.85 |
| Fuel Oil | 0.87 | 1.20 |

From these calculations, it is apparent that high purity carbonaceous reductant replaces significantly higher quantities of high cost coke than tuyere injectants such as coals and fuel oil that are now used.

In the catalytic disproportionation of carbon monoxide to high purity carbonaceous reductant, the preferred catalysts include metallic components. Examples of suitable catalysts are: iron, cobalt, nickel and binary and tertiary alloys of metal selected from this same group, including without limitation high nickel content and low nickel content steels. Metal ores such as ferrous and ferric oxides, nickel oxide and cobalt oxide also suitable catalysts. The catalysts may be in such forms as a powder, chips, buttons, foils, filaments, etc.

The catalyst may be used as a fixed bed, moving bed or entrained. Because at least some of the catalyst metal combines with the high purity carbonaceous reductant formed, the process of this invention operates most efficiently where the catalytic metal is the same metal undergoing treatment in the blast furnace. Hematite type iron ores, for example, catalyzes carbon monoxide disproportionation effectively, and is the preferred catalyst where the iron ore undergoes treatment in the blast furnace.

THE DRAWINGS

Figure 2:
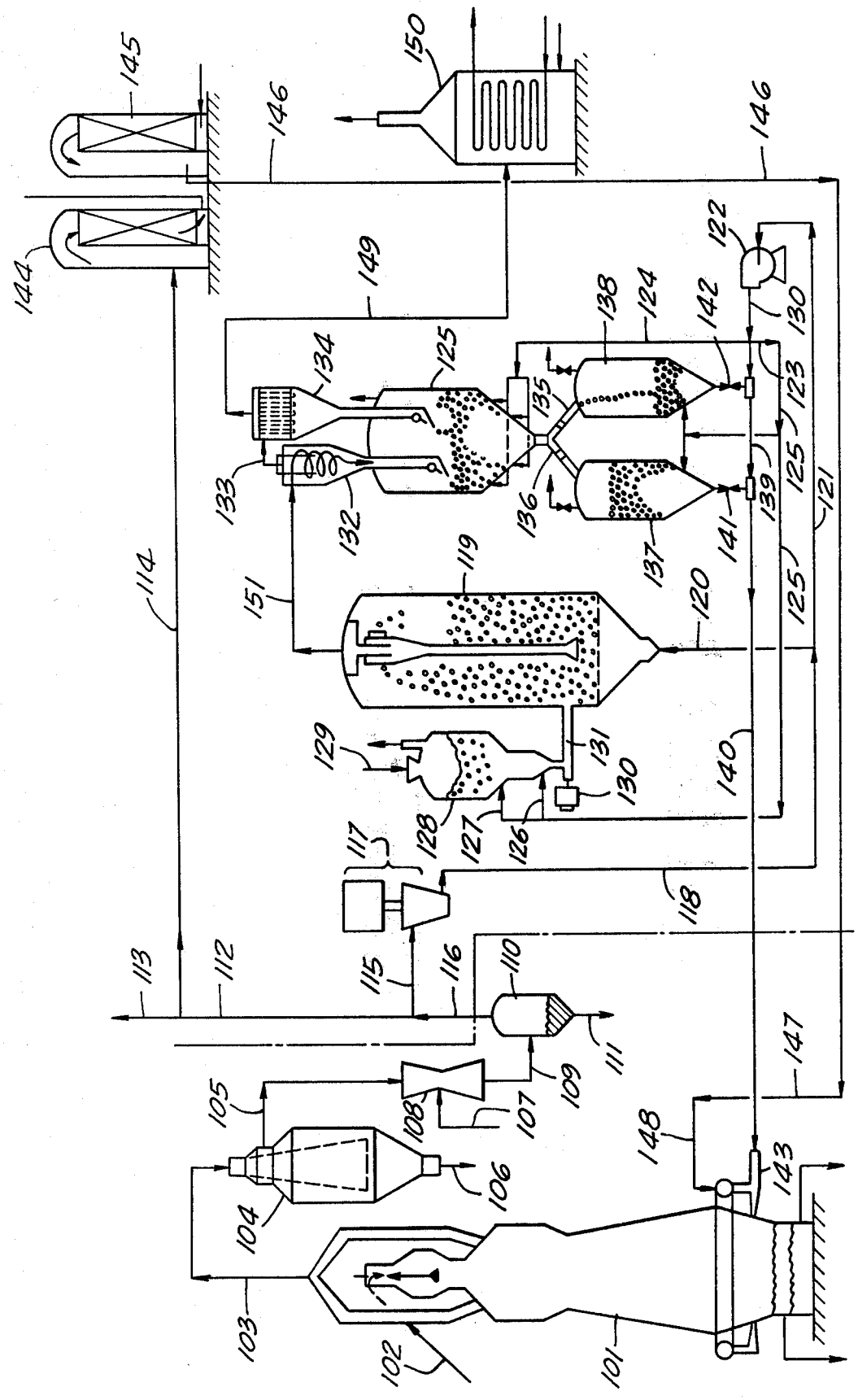

The process of this invention can be better understood by reference to the accompanying drawings in which:

FIG. 1 schematically illustrates the process of the invention as applied to blast furnace gases, and FIG. 2 details a working embodiment of the process of this invention where the high purity carbonaceous reductant of the process of this invention is fed to the tuyeres of a blast furnace.

THE PREFERRED EMBODIMENTS

In FIG. 1, metal ore such as iron ore undergoes reduction in blast furnace 1 at high temperatures initially produced by combustion of coke. Impurities such as sulfur compounds formed in furnace 1 are largely trapped in a slag layer whose principal constituent is limestone, which is added to furnace 1 with the metal ore.

Under the conditions prevailing in blast furnace 1, the coke undergoes gasification reactions, producing an off gas mixture comprising carbon monoxide, carbon dioxide, nitrogen and hydrogen. This mixture is recovered overhead and fed via line 2 to fluidized bed catalytic reactor 3. Reactor 3 contains a fluidized bed of catalyst, fed through line 4, preferably including the same metal that is undergoing reaction in blast furnace 1. The temperature in reactor 3 is preferably about 950° F.; the pressure, preferably atmospheric. Under these conditions, the carbon monoxide in the off gas mixture is converted to high purity carbonaceous reductant and deposits on the catalyst. High purity carbonaceous reductant so formed separates from the catalyst under agitation by the off gas stream, and passes overhead from reactor 3 via line 5 to separator 6.

In separator 6, the depleted blast furnace off gas passes overhead through line 7 for use as fuel, a heat source, or both. High purity carbonaceous reductant passes from separator through line 8 and is either fed directly to the tuyeres of blast furnace 1 via line 9, or passes through line 10 to mixer 11. When used as a tuyere injectant, it may be premixed with conventional tuyere injectant such as coal, oil, etc., or injected prior or subsequent to injection of such conventional materials into the tuyere zone.

In mixer 11, high purity carbonaceous reductant is briquetted according to conventional techniques. Here it is mixed with binder (e.g., coal derived binder or tar) added thereto through line 12. The binder/high purity carbonaceous reductant mixture passes via line 13 from mixer 11 to briquetter 14, and is there formed into briquettes. These briquettes are then fed to blast furnace 1 as a coke substitute via line 15.

FIG. 2 shows in greater detail the process outlined in FIG. 1. In FIG. 2, metal ore such as iron ore, coke and slag former such a limestone, are fed sequentially to blast furnace 101 via line 102 to form layers of these solid materials within the furnace. In blast furnace 101, the coke is ignited and burnt to produce a temperature greater than 3300° F. in tuyere zone. Combustion there produces a bosh gas comprising carbon monoxide, hydrogen and nitrogen which reduces the iron ore as the bosh gas moves up through the furnace. Off gases comprising carbon monoxide, carbon dioxide, hydrogen and nitrogen pass from furnace 101 via line 103 to separator 104.

In separator 104, solids are separated from the off gases, and recovered via line 106. Solids-free off gases pass via line 105 to quench vessel 108. Water enters vessel 108 via line 107, and cooled off gases exit vessel 108 through line 109. Entrained water in the off gases condense in condenser 110, and pass therefrom through line 111.

The major portion of the dry off gases passes from condenser 110 through lines 116 and 115 to heater/pressurizer 117, which raises the pressure and temperature of the off gases. The off gases then pass in major part through lines 118 and 120 to fluidized bed reactor 119. Metal ore enters reactor 119 from fluidized vessel 128 via screw feeder 131, which is driven by motor 130. Vessel 128 is fluidized with the off-gas propelled by compressor 122 through lines 130, 123, 125, 126 and 127. Metal ore enters vessel 128 via line 129.

In fluidized bed reactor 119, metal ore and off gases are intimately mixed, and the carbon monoxide in the off gases reacts to form reductant and carbon dioxide. At first, high purity carbonaceous reductant deposits on the surface of the catalyst, then breaks away from the catalyst and passes overhead through line 151 to cyclone 132, which separates high purity carbonaceous reductant from depleted off gases. Further separation of high purity carbonaceous reductant from depleted off gases takes place in heat exchanger 134, to which depleted off gases pass via line 133. Separated high purity carbonaceous reductant falls into surge vessel 125 from cyclone 132 and from multiclones 134. A portion of the blast furnace off gases from lines 118 and 121 are driven by compressor 122 through lines 130 and 124 to surge vessel 125, and continuously agitate the high purity carbonaceous reductant and catalyst therein.

From surge vessel 125, high purity carbonaceous reductant passes through lines 135 and 136 to smaller surge vessels 138 and 137, respectively, and thence to tuyere feed lines 139, 140 via lines 142 and 141. Off gases from compressor 122 drive the high purity carbonaceous reductant through lines 139, 140 to tuyere 143 and thence into blast furnace 101.

A minor portion of the off gases from line 112 pass through line 114 to furnace 144, and is used to heat cold air entering furnace 145 from the atmosphere. Such heated air passes via line 146, 147 and 148 to blast furnace 101, and enters the blast furnace through tuyere 143 with the high purity carbonaceous reductant.

Depleted off gases from exchanger 134 pass overhead therefrom via line 149 to heat exchanger 150, where the remaining heat from the off gases is used to convert water to steam.

The following Table I sets forth the heat and material balances that the gas mixtures in lines 105, 120, 149 and 121 could have if, we assume, our processes effectively utilizes 80% of the carbon monoxide and 20% of the hydrogen, from the blast furnace off gases to make high purity carbonaceous reductant.

TABLE 1

| Stream No. | 105 | 120 | 149 | 112 |
|---|---|---|---|---|
| Name | B.F. Off-Gas | Feed Gas | Depleted Gas | Carrier Gas |
| Mole % | | | | |
| CO | 21.8 | 21.4 | 4.7 | 21.4 |
| H$_2$ | 3.3 | 3.3 | 2.9 | 3.3 |
| CH$_4$ | 0.2 | 0.2 | 0.2 | 0.2 |
| CO$_2$ | 16.1 | 15.8 | 26.5 | 15.8 |
| N$_2$ | 53.4 | 52.3 | 57.3 | 52.3 |
| H$_2$O | 5.2 | 7.0 | 8.4 | 7.0 |
| Total | 100.0 | 100.0 | 100.0 | 100.0 |
| Lb Moles/Hr | | | | |
| CO | 3,944 | 2,762 | 552 | 20.3 |
| H$_2$ | 597 | 420 | 336 | 3.1 |
| CH$_4$ | 36 | 24 | 24 | 0.2 |
| CO$_2$ | 2,915 | 2,040 | 3,124 | 15.0 |
| N$_2$ | 9,663 | 6,760 | 6,760 | 49.7 |
| H$_2$O | 941 | 905 | 989 | 6.7 |
| Total | 18,096 | 12,911 | 11,785 | 95.0 |
| Stream No. | 105 | 120 | 149 | 121 |
| Name | B.F. Off-Gas | Feed-Gas | Depleted Gas | Carrier Gas |
| Lbs/Hr | | | | |
| CO | 110,448 | 77,350 | 15,460 | 568 |
| H$_2$ | 1,189 | 850 | 670 | 6 |
| CH$_4$ | 583 | 390 | 390 | 3 |
| CO$_2$ | 128,245 | 89,830 | 137,450 | 660 |
| N$_2$ | 270,560 | 189,360 | 189,360 | 1,392 |
| H$_2$O | 16,928 | 16,280 | 17,800 | 121 |
| Total | 527,953 | 374,060 | 360,130 | 2,750 |
| Temperature, °F. | 600 | 155 | 950 | 550 |
| Pressure, Psig | 2 | 5 | 0 | 80 |
| HHV[1], Btu/SCF | 83 | 81.5 | 26 | 81.5 |
| Total SCF/Hr | 685,800 | 4,893,300 | 4,446,500 | 36,000 |

HHV[1] = Higher Heating Value

The following example illustrates the effectiveness of Mesabi range iron ore for disproportionating the carbon monoxide in a blast furnace feed gas to a high purity reductant as a replacement for blast furnace grade coke.

EXAMPLE 1

FLUID BED DISPROPORTIONATION

Six hundred grams of Mesabi range iron ore was charged to a pilot plant disproportionation batch fluid bed reactor measuring 1.5 inches in diameter and 8 feed in height. The Mesabi range iron ore was predominately Fe$_2$O$_3$ and had the following assay:

Fe$_2$O$_3$: 79%
SiO$_2$: 8%
MnO$_2$: 1.4%
Al$_2$O$_3$: 0.8%
Moisture: 7.8%
All Other: 3.0%

A gas feed mixture typical of the off gases from a blast furnace and comprising carbon monoxide, carbon dioxide, hydrogen and nitrogen was prepared by metering the individual gases into a mixing manifold and periodically verifying their mixed composition by gas chromatographic analysis. The mixed feed gas was preheated to about 100° C. and charged to the bottom of the fluid bed reactor. The mixture passed upwardly through a gas distributor in the reactor, and fluidized the bed of iron ore therein. The reactor was held at about 445° C. with electric heating tapes and temperature controller, and a pressure of 20 psig was maintained in the reactor by means of a downstream back pressure regulator. The exit gas composition and total flow rate was measured at ten minute intervals using a gas chromatograph and wet test meter, respectively.

Initially, the $Fe_2O_3$ was reduced to $Fe_3O_4$ after exposure to about 4 liters per minute of the feed gas for about 30 minutes at 500° C. After this initial reduction, the overall oxygen material balance around the fluid bed indicated no further significant reduction of the iron ore. The carbon balance around the bed showed that a rapid deposition of carbon was taking place.

Table 2 shows the results of two steady state runs at 445° C., 20 psig pressure, and superficial gas residence times of 3 seconds and 5 seconds, respectively:

TABLE 2

|  |  | Run 1<br>3 Seconds<br>Residence Time | Run 2<br>5 Seconds<br>Residence Time |
|---|---|---|---|
| Inlet Flow Rate-Std. Ml/Min | $H_2$ | 151 | 95 |
|  | $N_2$ | 2724 | 1495 |
|  | CO | 1150 | 631 |
|  | $CO_2$ | 817 | 471 |
|  |  | 4842 | 2692 |
| Inlet Composition %/Vol | $H_2$ | 3.1 | 3.5% |
|  | $N_2$ | 56.2 | 55.5% |
|  | CO | 23.8 | 23.4% |
|  | $CO_2$ | 16.9 | 17.5% |
| Outlet Flow Rate-<br>Std. Ml/Min | $H_2$ | 97 | 53 |
|  | $N_2$ | 2719 | 1489 |
|  | CO | 466 | 209 |
|  | $CO_2$ | 1144 | 670 |
|  |  | 4426 | 2421 |
| Outlet Composition %/Vol | $H_2$ | 2.2 | 2.2 |
|  | $N_2$ | 61.4 | 61.5 |
|  | CO | 10.5 | 8.6 |
|  | $CO_2$ | 25.9 | 27.7 |
| % Utilization |  |  |  |
| Of CO |  | 60% | 67% |
| Of $H_2$ |  | 36% | 44% |
| Average Carbon deposition rate, grams carbon/hour-gram ore |  | 0.175 | 0.109 |

The data presented in Table 2 represents the average obtained over periods of 1 to 3 hours after attainment of steady state conditions in the reactor. As Table 2 shows, even with short residence times of 3 and 5 seconds, high conversion of carbon monoxide and hydrogen results from our process.

What is claimed is:

1. A process comprising disproportionating at least about 50% of a carbon monoxide feed, at a temperature in the range of about 400° C. to about 600° C. and at a pressure in the range of about 0 to about 100 psig with a metal catalyst to form a substantially ash-free and sulfur-free carbonaceous reductant having a carbon-to-hydrogen ratio of at least about 10, and then feeding said carbonaceous reductant to a metal ore treatment process as a fuel.

2. The process of claim 1 wherein said carbonaceous reductant is briquetted for use in said process.

3. The process of claim 1 wherein said carbonaceous reductant is used in particulate form in said process.

4. The process of claim 1 wherein said process proceeds in a blast furnace and said carbon monoxide forms in the blast furnace.

5. The process of claim 1 wherein said carbonaceous reductant includes less than about 0.01% sulfur by weight and less than about 1% by weight ash.

6. The process of claim 1 wherein said metallic catalyst is selected from the group consisting of (a) iron, cobalt, nickel, (b) binary and tertiary alloys of metals selected from the group consisting of iron, cobalt and nickel, and (c) oxides of iron, cobalt, and nickel.

7. A process for making metal in a blast furnace comprising reacting metal ore with coke to form a reducing gas mixture including carbon monoxide, recovering and converting at least about 50% of said carbon monoxide into carbon dioxide and into a substantially ash-free, sulfur-free carbonaceous reductant having a carbon-to-hydrogen ratio of at least about 10 by contacting said carbon monoxide with a catalyst that includes a metallic component at temperatures in the range of about 400° C. to about 600° C., and at a pressure in the range of about 0 to about 100 psig, and then feeding said carbonaceous reductant to said blast furnace as a substitute for at least a substantial part of said coke.

8. The process of claim 7 wherein said catalyst has essentially the same composition as the metal ore being reduced, and at least a part of said catalyst is fed to said blast furnace with said high purity carbonaceous reductant.

9. The process of claim 7 wherein said high purity carbonaceous reductant is fed in particulate form to said blast furnace.

10. The process of claim 9 wherein a minor portion of said gas mixture is used to drive said high purity carbonaceous reductant to at least one tuyere zone in said blast furnace.

11. The process of claim 10 wherein a minor portion of said gas mixture is used to agitate at least one surge zone for said high purity carbonaceous reductant.

12. The process of claim 7 wherein said high purity carbonaceous reductant is fed in briquette form to said blast furnace.

13. In a process for making iron in a blast furnace from iron ore where coke is used to form a reducing gas including carbon monoxide and and tuyere injectant is fed into a tuyere zone in the furnace, the improvement comprising recovering and converting at least 50% of unused carbon monoxide by contacting said carbon monoxide with a catalyst including an iron component at a temperature in the range of about 400° C. to about 600° C., and at a pressure in the range of about 0 to about 100 psig to form a tuyere injectant of substantially ash and sulfur-free carbonaceous reductant having a carbon-to-hydrogen weight ratio of at least about 10 and feeding said reductant to the tuyere zone of the furnace.

14. The process of claim 13 where coal or fuel oil is mixed with the tuyere injectant.

* * * * *